W. J. MAHONEY.
WIRE LINK FABRIC.
APPLICATION FILED MAR. 1, 1920.
1,406,406. Patented Feb. 14, 1922.
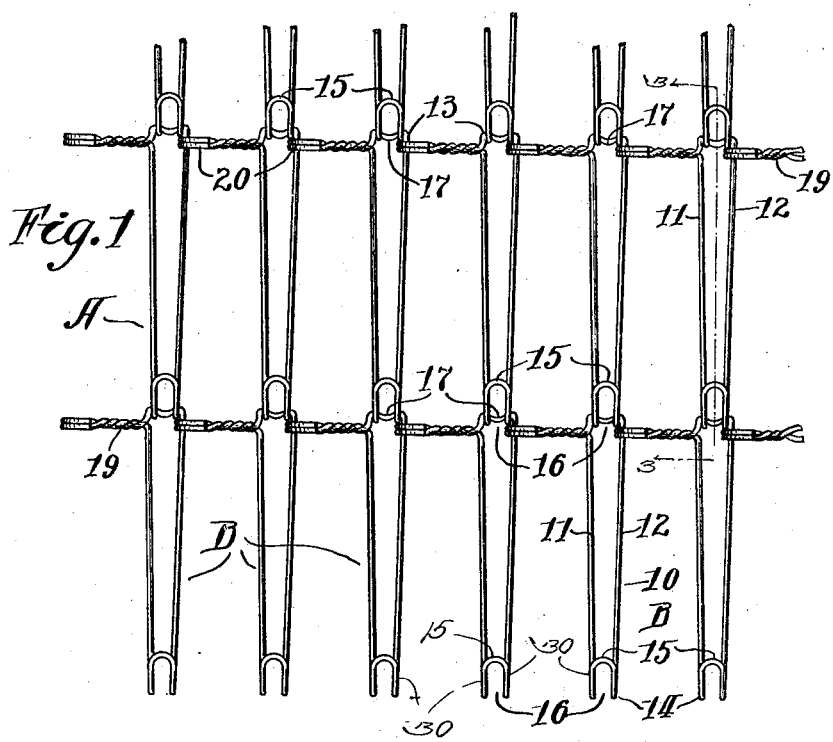
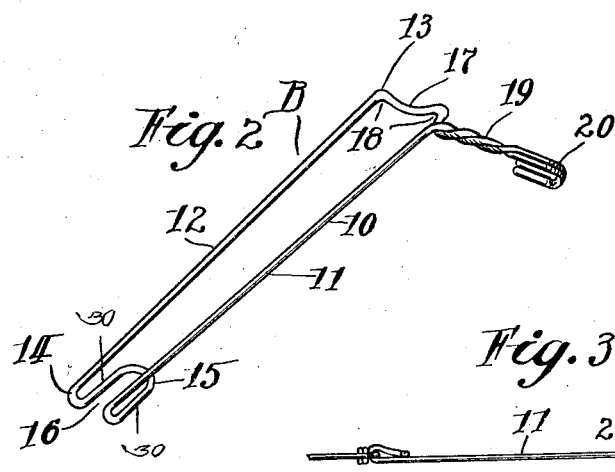
Inventor:
William J. Mahoney
by: *[signature]*,
Attorney.

UNITED STATES PATENT OFFICE.

WILLIAM J. MAHONEY, OF ST. PAUL, MINNESOTA.

WIRE-LINK FABRIC.

1,406,406.          Specification of Letters Patent.     Patented Feb. 14, 1922.

Application filed March 1, 1920. Serial No. 362,213.

*To all whom it may concern:*

Be it known that I, WILLIAM J. MAHONEY, a citizen of the United States, residing at St. Paul, in the county of Ramsey and State of Minnesota, have invented a new and useful Improvement in Wire-Link Fabrics, of which the following is a specification.

My invention relates to improvements in wire link fabric which is made up of a series of complete links that are adapted to be connected together to form a noiseless, flexible fabric which is particularly adapted for bed springs where a flexibility without sagging or distortion of the shape of the links is an essential feature, owing to the requirement of supporting purposes of the fabric for bed springs.

The invention includes means for connecting the links longitudinally to hold the sides of the links which form the same spaced apart to aline the links longitudinally with each other, and means for engaging the adjacent links projecting from the side near or at the corner of each link to form a transverse connection in the wire link fabric which is substantially at right angles to the longitudinal connection of the links.

In the drawings illustrating my invention:

Figure 1 is a plan view of a portion of my wire link fabric,

Fig. 2 is a perspective view of one of the complete links, and

Fig. 3 is a section on the line 3—3 of Fig. 1.

In the drawing only a portion of the fabric A is illustrated, which is made up of a series or plurality of wire links B, each of which is formed identical from a single piece of wire of the desired gage.

In the formation of the links B the wire 10 is bent to form side arms 11 and 12, which converge from the end 13 to the end 14 toward each other so that the body portion of the link B is formed narrower at the end 14 than it is at the end 13.

The ends of the sides 11 and 12 are bent back toward each other to form a pair of parallel hooks 30 at the end 14 with an open space 16 between the ends of the sides 11 and 12 said hooks being connected by a bridge 15. The wire 10 at the end 13 is curved inwardly to form a hump 17 with recesses 18 at the corners of the link B.

The ends of the wire 10 in the formation of the link B extend from the side 11 and one of the recesses 18 at the end 13 into the twisted portion 19, while the extremities of the ends are brought together parallel to each other and bent to form an engaging hook 20. The twisted portion 19 forms the shank or arm for connecting the hook 20 with the side 11 so that the shank 19 extends approximately at right angles to the longitudinal axis of the link B, being spaced close to the corner formed by one of the recesses 18.

The wire link fabric A is composed of a plurality of the links B, as illustrated in Fig. 1, and the hooks 30 engage in the recesses 18 on either side of the hump or bulge 17 to hold the ends of the side members 11 and 12 spaced apart with the bulge 17 extending into the space 16 at the end 14 of the link. The identical formation of each of the links B causes the same to fit together into engagement with the adjacent links so that the hook 30 of one link will engage the end 13 of the adjacent link, and the peculiar construction of the spaced-apart sides 11 and 12, in co-operation with the hump or bulge 17, causes the links to be held in alinement in the fabric A when the same is put together.

The shanks 19 with the hooks 20, which project from the side 11 near the corner of the end 13, form a transverse connection in the fabric at one end of each of the links, and extend across the fabric in alinement practically at right angles to the longitudinal connections of the links. This feature of the invention is of primary importance, for in the use of my fabric for bed springs it is essential to provide a flexible, nonstretching, noiseless fabric, the links of which will not pull out of shape, causing the fabric to sag or buckle in the frame. The connection of the arms or shanks 19 close to the corner of the end 13 of the link permits the strain of the transverse connection of the link to be transmitted to the connecting portion which forms the hump 17, which connects the sides 11 and 12 at the end 13. The hump 17 stiffens this portion of the link to strengthen the same and to add to the rigidity of the link. This construction gives a link of practically an L-shape with the side portions 11 and 12 of the body spaced apart throughout the longitudinal length of the link, which spreads the engaging surface of the link. It is obvious that the link fabric can be used for any desired purpose. The links all being similar can be easily made on an automatic machine of the design necessary, and while a particular form and construction is illustrated in the drawings and described in the specification, I do not wish to confine my invention to this exact illustration, but desire to protect the same within the scope of the appended claims.

Having described my invention what I claim is:

1. A wire fabric link formed of a single piece of wire having a pair of diverging body portions positioned in a plane and separated throughout their length, a pair of parallel hooks formed at the end of said body portions by bending the ends thereof out of the plane of said body portions, a bridge connecting said hooks together, a pair of recesses formed at the other end of said body portions adapted to receive corresponding hooks of other links, a hump positioned between said recesses for holding said hooks in spaced relation, the ends of said wire link being bent outwardly at right angles from one of said body portions in close proximity to said humped portion, said bent out portions being twisted, and a pair of hooks bent outwardly from said twisted portions in substantially the plane of said body members.

2. A link wire fabric, having a series of links formed from a piece of wire, the sides of said links converging toward one end thereof, a hook formed on the small end of each of said links, a hump formed in the other end of each link adapted to separate the sides of said link, and a hook formed by the ends of the wire forming said link extending from one side of said link at the end having said hump.

3. A link for a flexible, non-stretching wire fabric, said link having a body portion formed with spaced-apart side members, a hook formed on one end of said body portion, the closing end of said hook forming a bridge to hold the sides of the body portion together with the engaging ends of the hook separated to form an open space in said hook, a bowed connecting bridge formed at the other end of said body portion, recesses on either side of the bowed portion of said bridge adapted to receive the engaging ends of said hook, a twisted shank extending from one side of said body portion near the corner of one of said recesses, and a hook formed on the end of said twisted shank thus forming a link with longitudinal and transverse connecting means all adapted to make up a flexible non-stretching fabric by connecting a plurality of said links.

WILLIAM J. MAHONEY.